United States Patent
Hwang et al.

(10) Patent No.: US 10,704,536 B2
(45) Date of Patent: Jul. 7, 2020

(54) AIR-COMPRESSION ENERGY-STORAGE AND POWER-SUPPLY SYSTEM HAVING AIR PURIFICATION CAPABILITY THROUGH USING SOLAR ENERGY

(71) Applicants: Yuan-Cheng Hwang, Taichung (TW); Ku-Ping Tsen, Taichung (TW)

(72) Inventors: Yuan-Cheng Hwang, Taichung (TW); Ku-Ping Tsen, Taichung (TW)

( * ) Notice: Subject to any disclaimer, the term of this patent is extended or adjusted under 35 U.S.C. 154(b) by 231 days.

(21) Appl. No.: 15/996,150

(22) Filed: Jun. 1, 2018

(65) Prior Publication Data
US 2019/0368475 A1 Dec. 5, 2019

(51) Int. Cl.
| | | |
|---|---|---|
| *F03G 6/04* | (2006.01) | |
| *F03D 9/17* | (2016.01) | |
| *H02S 10/12* | (2014.01) | |
| *F03G 6/00* | (2006.01) | |
| *H02S 40/12* | (2014.01) | |
| *H02S 10/20* | (2014.01) | |
| *F24F 3/16* | (2006.01) | |
| *F03D 1/02* | (2006.01) | |
| *F03D 9/37* | (2016.01) | |
| *F03D 9/25* | (2016.01) | |

(52) U.S. Cl.
CPC ............... *F03G 6/04* (2013.01); *F03D 9/17* (2016.05); *F03G 6/001* (2013.01); *F24F 3/1603* (2013.01); *H02S 10/20* (2014.12); *H02S 40/12* (2014.12); *F03D 1/025* (2013.01); *F03D 9/25* (2016.05); *F03D 9/37* (2016.05); *F05B 2220/602* (2013.01); *F05B 2220/604* (2013.01); *F05B 2240/131* (2013.01); *H02S 10/12* (2014.12); *Y02B 10/10* (2013.01); *Y02B 10/30* (2013.01); *Y02E 10/50* (2013.01); *Y02E 10/70* (2013.01)

(58) Field of Classification Search
None
See application file for complete search history.

(56) References Cited

U.S. PATENT DOCUMENTS

| | | | | |
|---|---|---|---|---|
| 1,576,373 A | * | 3/1926 | Smith | F03D 1/04 415/75 |
| 3,191,517 A | * | 6/1965 | Solzman | A62B 13/00 454/252 |
| 4,476,853 A | * | 10/1984 | Arbogast | F24D 11/003 126/578 |

(Continued)

*Primary Examiner* — Abiy Teka
*Assistant Examiner* — Michael Quandt
(74) *Attorney, Agent, or Firm* — Chun-Ming Shih

(57) ABSTRACT

Disclosed is an air-compression energy-storage and power-supply system having air purification capability through using solar energy. The system includes: a solar energy power supply device, it utilizes solar energy to produce power for the system itself, and for users to use in daytime; an air purification device, with its exhaust fan connected to a transformer power distribution device to obtain the power for rotation, so that outside air flows into the air cylinder after filtering by the air filter, then the purified air is exited from the air cylinder to provide purified air; an air-compression energy-storage and power-supply device, used to compress the purified air into high pressure for storage, and the high pressure purified air is released at night, for the generator to produce power for user to use at night; and a wind power transmission device, disposed above the air purification device.

5 Claims, 3 Drawing Sheets

(56) References Cited

U.S. PATENT DOCUMENTS

| | | | | |
|---|---|---|---|---|
| 7,964,787 B2* | 6/2011 | Jaisinghani | ............. | F03G 6/001 |
| | | | | 136/244 |
| 2011/0095538 A1* | 4/2011 | Tabe | ...................... | F03D 9/008 |
| | | | | 290/55 |
| 2014/0202514 A1* | 7/2014 | Ting | ....................... | H02S 40/12 |
| | | | | 136/244 |

* cited by examiner

AIR-COMPRESSION ENERGY-STORAGE AND POWER-SUPPLY SYSTEM HAVING AIR PURIFICATION CAPABILITY THROUGH USING SOLAR ENERGY

BACKGROUND OF THE INVENTION

Field of the Invention

The present invention relates to green energy power generation, and in particular to an air-compression energy-storage and power-supply system having air purification capability through using solar energy and wind power.

The Prior Arts

Presently, the power generation of the power company can be classified into large-scale power generation, medium-scale power generation, and small-scale power generation. In general, the large-scale power generation includes nuclear power generation, hydroelectric power generation, and thermal power generation. The benefit of it is that, it may provide large amount of power supply on the whole day power generation basis, yet it is liable to cause pollution to adversely affect the ecosystem. On the other hand, the medium-scale power generation includes wind power generation, and solar energy power generation. Though it may have the benefits of making use of green energy of the Nature, to perform clean power generation, yet, in fact, the amount of power it generates is rather limited and insufficient, and is liable to be adversely affected by the occasional or frequent insufficiency of solar light intensity and wind power intensity.

For the various approaches of power generations, the power produced must go through transmission and distribution line and network, to reach the end user. The cost of setting up such a large network is quite enormous, while the power transmission loss could cause terrible waste of energy.

Therefore, presently, the design and performance of the power generation and supply system is not quite satisfactory, and it leaves much room for improvement.

SUMMARY OF THE INVENTION

In view of the problems and drawbacks of the prior art, the present invention provides an air-compression energy-storage and power-supply system having air purification capability through using solar energy, to redress the shortcomings of the Prior Art.

The major objective of the present invention is to provide an air-compression energy-storage and power-supply system having air purification capability through using solar energy, that includes: a solar energy power supply device, an air purification device, and an air-compression energy-storage and power-supply device.

The solar energy power supply device is disposed on an upper layer of the system, including at least a solar photoelectric plate, a controllable refraction plate, and a transformer power distribution device. The refraction plate is movably placed on the solar photoelectric plate, and it can be lifted to remove the snow, or it can be tilted to an angle for the sunlight to irradiate in. Power is generated by the solar photoelectric plate, for it to be connected to the transformer power distribution device to provide power in daytime.

The air purification device is disposed on the middle layer of the system, and is provided with an air cylinder having a plurality of intake channels around its perimeter. On the air cylinder is provided with an outlet channel. In the respective intake channel is disposed an air filter and an exhaust fan. The exhaust fan is connected to the transformer power distribution device to obtain the power for its rotation, so that air outside the intake channels flows into the air cylinder after being filtered by the air filter, then the purified air is exited from the outlet channels to provide purified air.

The air-compression energy-storage and power-supply device is disposed on the bottom layer of the system, and it includes at least an air compressor, with its intake end provided with an air filter. The outlet end is provided with at least a high pressure gas tank, to store the purified air of high pressure. The air compressor is connected electrically to the transformer power distribution device, to obtain the power to run. The purified air of high pressure is stored in the high pressure gas tank, an outlet end of the high pressure gas tank is connected electrically to a pneumatic coupler. As such, through the pneumatic coupler, the high pressure purified air drives the generator to produce power for use at night.

A transmission shaft runs through the center of the air purification device. The lower end of the transmission shaft drives the air compressor to run through a transmitter in a single direction. The middle section of the transmission shaft is provided with a plurality of fan blades arranged in an air cylinder. The strong wind produced by the purified air exiting from the air cylinder is used to bring the transmission shaft to rotate at high speed in a single direction. As such, the transmitter drives the air compressor to run, while the high pressure purified air is stored in the high pressure gas tank. In this way, through the pneumatic coupler, the high pressure purified air in the high pressure gas tank is released to drive the generator to run, to provide power for use at night.

In an aspect of the present invention, a wind power transmission device is disposed above the air purification device. The wind power transmission device includes a radiation shape wind wheel, that is connected to a one-way clutch on the upper end of the transmission shaft. The rear end of each wind blade is provided with a bend portion to gather more wind for rotation. When the rotation speed of the wind power transmission device is greater than that of the transmission shaft in the air cylinder below, the wind power transmission device is able to drive the transmission shaft to accelerate through using the one-way clutch; otherwise the transmission shaft will not accelerate.

In another aspect of the present invention, the solar photoelectric plate is disposed on a rack; while the refraction plate is disposed on the solar photoelectric plate, and is controlled by a pneumatic cylinder.

In a yet another aspect of the present invention, a high pressure intake portion is disposed between the high pressure gas tank and the air compressor; while a high pressure outlet portion is disposed between the high pressure gas tank and the pneumatic cylinder.

In a further aspect of the present invention, the air compressor is further connected to a plurality of high pressure gas tanks.

Compared with the existing technology, in the present invention, a controllable refraction plate is installed on the solar photoelectric plate, to remove snow cover and enhance sunlight irradiation, so that the solar energy power supply device may gather sufficient sunlight intensity, to generate power for the system itself and the users to use in daytime. Moreover, when the exhaust fan of the air purification device is rotated, the outside air is taken in and filtered by the air filter, then it flows into the air cylinder to be exited from the air cylinder, to provide purified air for subsequently use. In addition, the air-compression energy-storage and power-supply device is adapted to compress the purified air to high pressure for storage, and to be used at night by the generator to produce power for the user to use. Further, the wind power transmission device is adapted to use through the one-way clutch, to bring the transmission shaft to drive the air compressor to run. In the present invention, different devices are combined and integrated into a system, to achieve the benefit of power generation, clean air, reduced pollution, and energy conservation, to provide electric power for the user to use both in daytime and at night.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detail descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
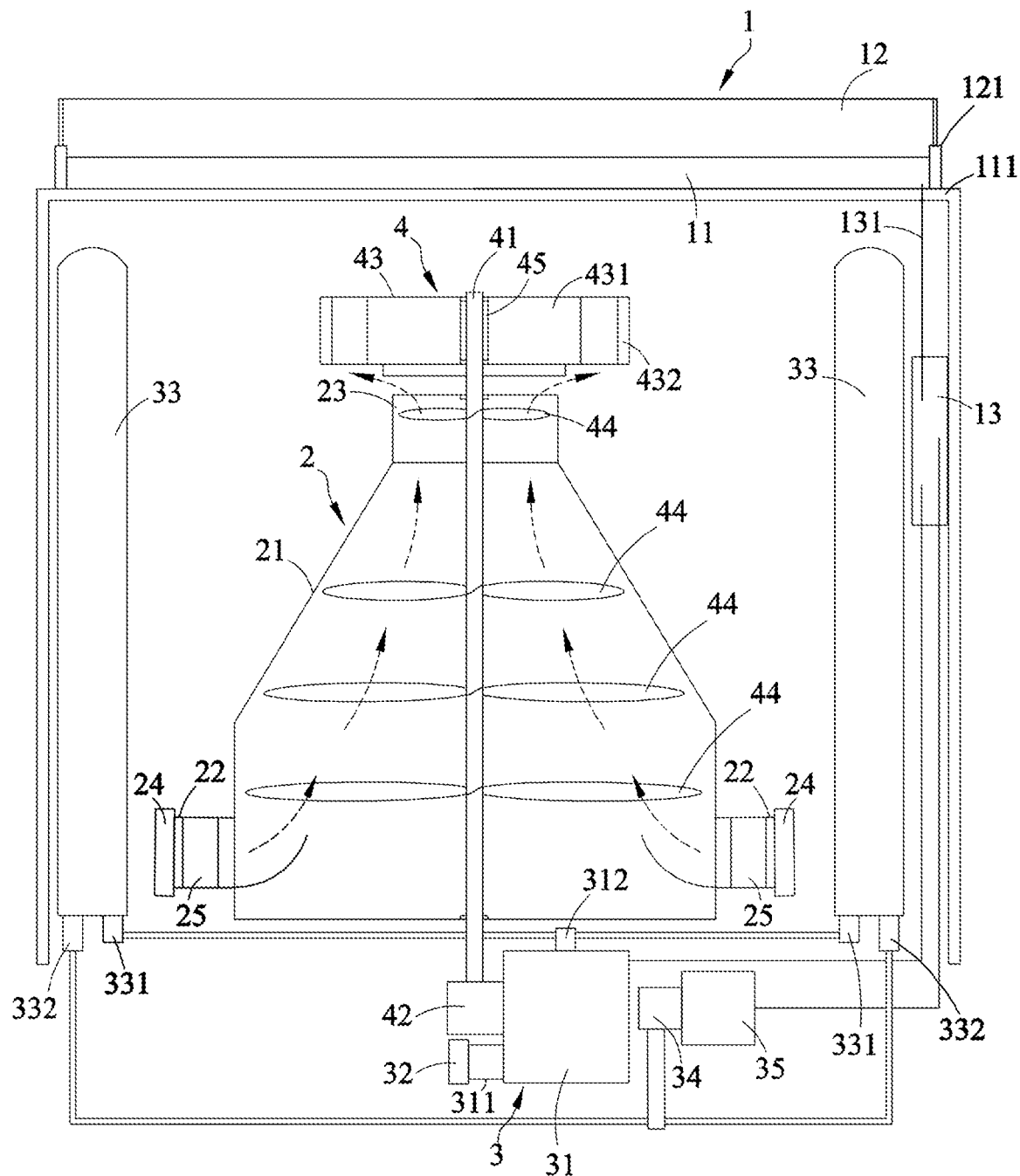
FIG. 1 is a schematic diagram for an air-compression energy-storage and power-supply system according to the present invention.
Figure 2:
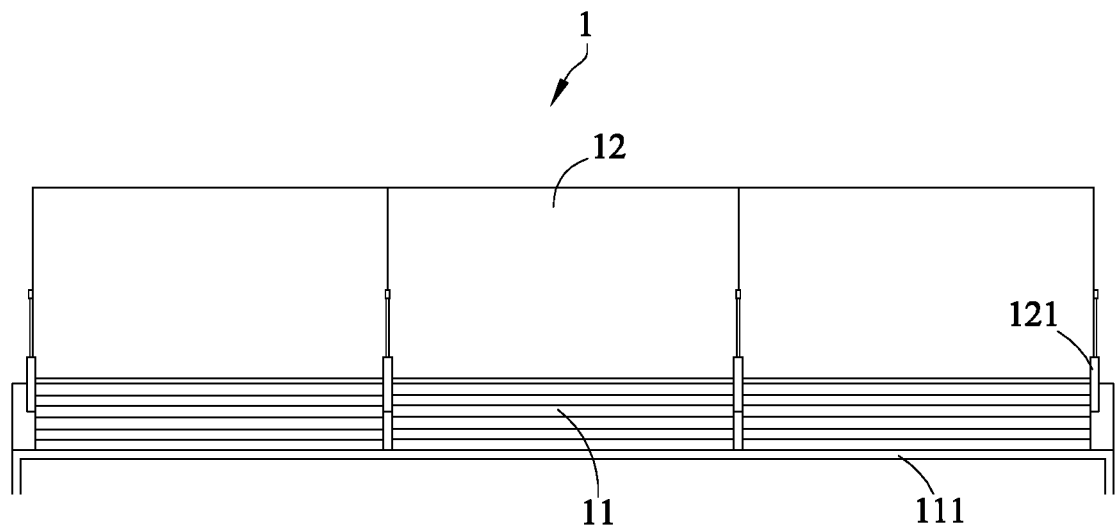
FIG. 2 is a front view of the refraction plate installed on a solar photoelectric plate according to the present invention.
Figure 3:
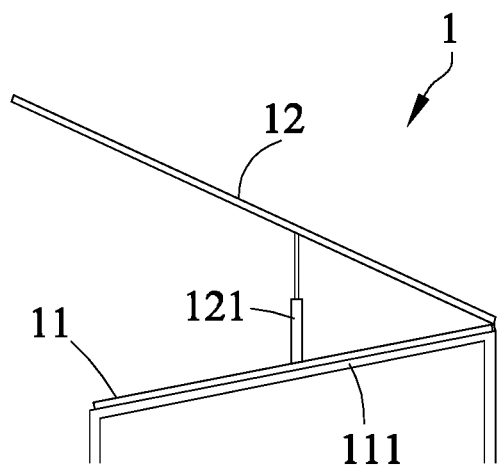
FIG. 3 is a side view of the refraction plate installed on a solar photoelectric plate according to the present invention.

Refer to FIGS. 1 to 3 respectively for a schematic diagram for an air-compression energy-storage and power-supply system according to the present invention; a front view of the refraction plate installed on a solar photoelectric plate according to the present invention; and a side view of the refraction plate installed on a solar photoelectric plate according to the present invention. As shown in FIGS. 1 to 3, the air-compression energy-storage and power-supply system having air purification capability through using solar energy mainly includes: a solar energy power supply device 1, an air purification device 2, and an air-compression energy-storage and power-supply device 3.

The solar energy power supply device 1 is disposed on an upper layer of the system, including at least a solar photoelectric plate 11, a controllable refraction plate 12, and a transformer power distribution device 13. The solar photoelectric plate 11 is installed on the rack 111. The refraction plate 12 is installed on the solar photoelectric plate 11, and is controlled by the pneumatic cylinder 121, so that the refraction plate 12 can be movably covered on the solar photoelectric plate 11. The pneumatic cylinder 121 is able to control the refraction plate 12 to tilt to a certain angle to refract sunlight, to enhance the sun light irradiation, and to remove ice that may cover on the refraction plate 12. As such, solar photoelectric plate 11 is able to receive sufficient sunlight to produce power, and then transmit the power to the transformer power distribution device 13 through the cables 131, to supply power for itself and the user to use in daytime.

The air purification device 2 is disposed on the middle layer and is provided with an air cylinder 21 having a plurality of intake channels around its perimeter. On the air cylinder 21 is provided with an outlet channel 23. In each of the plurality of intake channels 22 is disposed an air filter 24 and an exhaust fan 25. The exhaust fan 25 is connected to the transformer power distribution device 13 to obtain the power for its rotation, so that air outside the intake channels 22 flows into the air cylinder 21 after filtering by the air filter 24, then the purified air is exited from the outlet channels 23.

The air-compression energy-storage and power-supply device 3 is disposed on the bottom layer of the system, and it includes at least an air compressor 31, with its intake end 311 provided with another air filter 32. The outlet end 312 is provided with at least a high pressure gas tank 33, to store the purified air of high pressure. In another embodiment, two high pressure gas tanks 33 are provided, but the present invention is not limited to this. The air compressor 31 is connected electrically to the transformer power distribution device 13, to obtain the power to run. The purified air of high pressure is stored in the high pressure gas tank 33, an outlet end of the high pressure gas tank 33 is connected electrically to a pneumatic coupler 34. As such, through the pneumatic coupler 34, the high pressure purified air drives the generator 35 to produce power for use at night.

A transmission shaft 41 runs through the center of the air purification device 2. The lower end of the transmission shaft 41 drives the air compressor 31 to run through a transmitter 42 in a single direction. The middle section of the transmission shaft 41 is provided with a plurality of fan blades 44 arranged in an air cylinder 21. The strong wind produced by the purified air exiting from the air cylinder 21 is used to bring the plurality of fan blades 44 into rotation, that in turn brings the transmission shaft 41 to rotate at high speed in a single direction. As such, wind power reaches the transmitter 42 through the transmission shaft 41, and the transmitter 42 drives the air compressor 31 to run, while the high pressure purified air is stored in the high pressure gas tank 33. In this way, through the pneumatic coupler 34, the high pressure purified air in the high pressure gas tank 33 is released to drive the generator 35 to run, to provide power for use at night.

Figure 4:
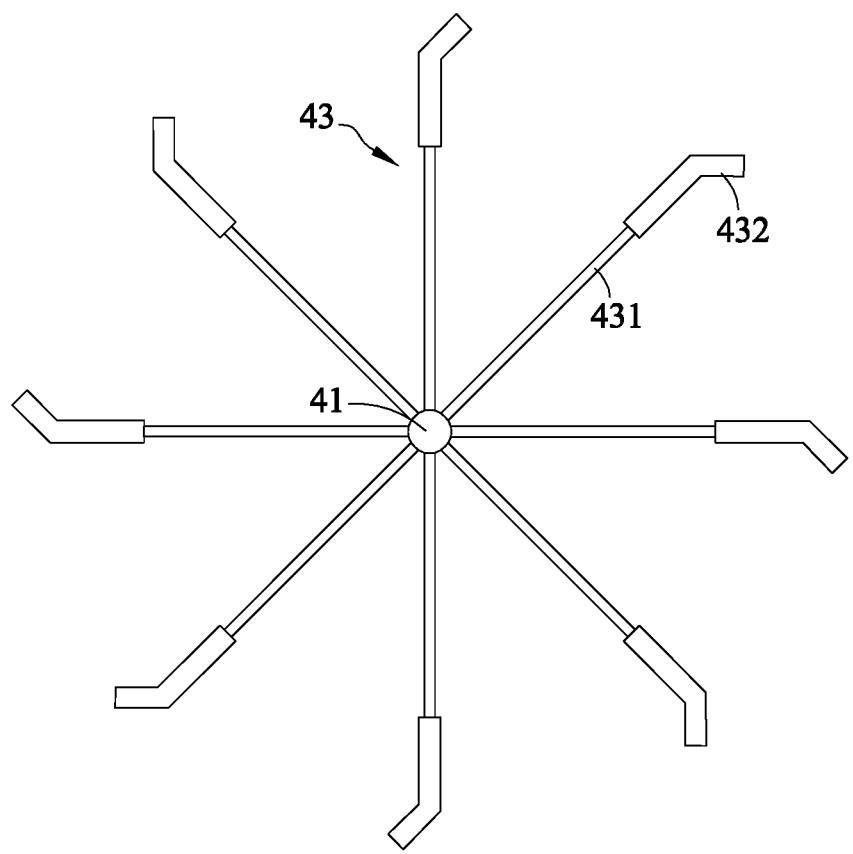
FIG. 4 is a top view of wind wheel of the wind power transmission device according to the present invention.
Figure 5:
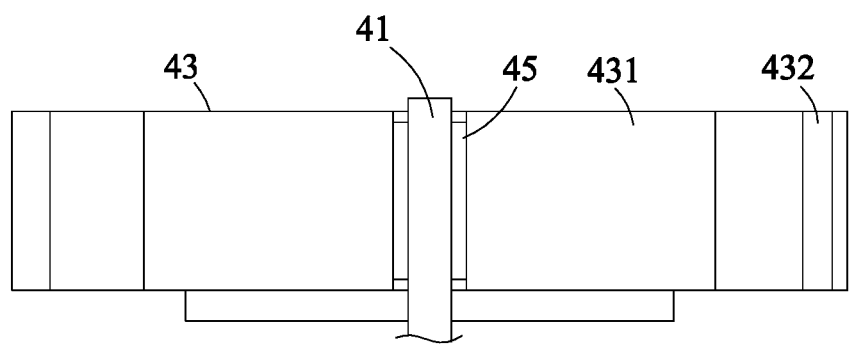
FIG. 5 is a side view of wind wheel of the wind power transmission device according to the present invention.

As shown in FIGS. 1, 4 and 5, a wind power transmission device 4 is disposed between the air purification device 2 and the air compressor 31. The wind power transmission device 4 includes a wind wheel 43 of radiation shape, located on an upper end of the transmission shaft 41, and connected to the one-way clutch 45. A bend portion 432 is provided at the rear end of each wind blade 431. The bend portion 432 is used to enhance the wind gathering ability of the wind blade 431, to drive the transmission shaft 41 to rotate at high speed in a single direction. When the rotation speed of the wind power transmission device 4 is greater than that of the transmission shaft 41 in the air cylinder 21, and through the action of the one-way clutch 45, the rotation of the transmission shaft 41 can be accelerated. Otherwise, the rotation of the transmission shaft 41 will not be accelerated. Moreover, the power produced by the solar energy power supply device 1 can be used directly to drive the air-compression energy-storage and power-supply device 3 to work.

When the air compressor 31 of the air-compression energy-storage and power-supply device 3 is driven to work, it is able to compress the purified air to high pressure. Then, the high pressure purified air is sent through a high pressure intake portion 331 to the high pressure gas tank 33 for storage as an energy resource. In the nighttime, the high pressure purified air can be released through a high pressure outlet portion 332 to the pneumatic coupler 34, to drive the generator 35 to produce power, for the user to use at night.

Summing up the above, in the present invention, different devices are combined and integrated into a system, to achieve the benefit of power generation, clean air, reduced pollution, and energy conservation, to provide electric power for the user to use both in daytime and at night. As such, the present invention does fulfill the requirement of a patent and have patent value.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An air-compression energy-storage and power-supply system having air purification capability through using solar energy, comprising: a solar energy power supply device, an air purification device, and an air-compression energy-storage and power-supply device, wherein
   the solar energy power supply device is disposed on an upper layer of the system, and the solar energy power supply device includes at least a solar photoelectric plate, a controllable refraction plate, and a transformer power distribution device, the refraction plate is movably placed on the solar photoelectric plate, and the refraction plate is lifted to remove snow, or the refraction plate is tilted to an angle for the sunlight to irradiate on, power is generated by the solar photoelectric plate, and the solar photoelectric plate is connected to the transformer power distribution device to provide power in daytime;
   the air purification device is disposed on a middle layer of the system, and the air purification device is provided with an air cylinder having a plurality of intake channels around a perimeter of the air cylinder, on the air cylinder is provided with an outlet channel, in each of the plurality of intake channels is disposed an air filter and an exhaust fan, the exhaust fan is connected to the transformer power distribution device to obtain the power for rotation, so that air outside the intake channels flows into the air cylinder after being filtered by the air filter, then the purified air is exited from the outlet channels to provide purified air;
   the air-compression energy-storage and power-supply device is disposed on a bottom layer of the system, and the air-compression energy-storage and power-supply device includes at least an air compressor, with an intake end of the air compressor provided with another air filter, and with an outlet end of the air compressor provided with at least a gas tank, to store purified air, the air compressor is connected to the transformer power distribution device, to obtain the power to run, the purified air is stored in the gas tank, an outlet end of the gas tank is connected to a pneumatic coupler, and through the pneumatic coupler, the purified air drives a generator to produce power for use at night; and
   a transmission shaft runs through a center of the air purification device, a lower end of the transmission shaft drives the air compressor to run through a transmitter in a single direction, the middle section of the transmission shaft is provided with a plurality of fan blades arranged in the air cylinder, wind produced by the purified air exiting from the air cylinder is used to bring the transmission shaft to rotate in a single direction, the transmitter drives the air compressor to run, and the purified air is stored in the gas tank, through the pneumatic coupler, the purified air in the gas tank is released to drive the generator to run, to provide power for use at night.

2. The air-compression energy-storage and power-supply system having air purification capability through using solar energy as claimed in claim 1, further comprising:
   a wind power transmission device disposed above the air purification device, the wind power transmission device includes a wind wheel, that is connected to a one-way clutch on an upper end of the transmission shaft, a rear end of each wind blade is provided with a bend portion to gather wind for rotation.

3. The air-compression energy-storage and power-supply system having air purification capability through using solar energy as claimed in claim 1, wherein
   the solar photoelectric plate is disposed on a rack; while the refraction plate is disposed on the solar photoelectric, and the refraction plate is controlled by a pneumatic cylinder.

4. The air-compression energy-storage and power-supply system having air purification capability through using solar energy as claimed in claim 1, wherein
   an intake portion is disposed between the gas tank and the air compressor, and an outlet portion is disposed between the gas tank and the pneumatic coupler.

5. The air-compression energy-storage and power-supply system having air purification capability through using solar energy as claimed in claim 1, wherein the air compressor is connected further to a plurality of gas tanks.

* * * * *